United States Patent
Yamazaki et al.

(10) Patent No.: US 12,107,378 B2
(45) Date of Patent: Oct. 1, 2024

(54) LIGHT ABSORBING LAYER AND BONDED BODY COMPRISING LIGHT ABSORBING LAYER

(71) Applicant: JX Nippon Mining & Metals Corporation, Tokyo (JP)

(72) Inventors: Yoshiki Yamazaki, Ibaraki (JP); Makoto Mikami, Ibaraki (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 227 days.

(21) Appl. No.: 17/286,863

(22) PCT Filed: Oct. 28, 2019

(86) PCT No.: PCT/JP2019/042123
§ 371 (c)(1),
(2) Date: Apr. 20, 2021

(87) PCT Pub. No.: WO2020/144915
PCT Pub. Date: Jul. 16, 2020

(65) Prior Publication Data
US 2021/0336408 A1   Oct. 28, 2021

(30) Foreign Application Priority Data

Jan. 10, 2019   (JP) .................................. 2019-002307

(51) Int. Cl.
*H01S 5/00*   (2006.01)
*H01S 3/06*   (2006.01)
(Continued)

(52) U.S. Cl.
CPC .......... *H01S 3/0625* (2013.01); *H01S 3/0612* (2013.01); *H01S 3/0617* (2013.01);
(Continued)

(58) Field of Classification Search
CPC .... H01S 3/0625; H01S 3/0612; H01S 3/0617; H01S 3/16; H01S 3/1643; H01S 3/17; H01S 2301/02; C03C 4/08
See application file for complete search history.

(56) References Cited

U.S. PATENT DOCUMENTS 4,084,974 A * 4/1978 Beall ................... C03C 10/0045
501/63
4,217,382 A * 8/1980 Toratani ................... C03C 3/17
372/40
(Continued)

FOREIGN PATENT DOCUMENTS

JP   S62-226838 A   10/1987
JP   2004-349701 A  12/2004
(Continued)

OTHER PUBLICATIONS

European Search Report issued in corresponding EP Patent Application No. 19908093.8 on May 27, 2022.
(Continued)

*Primary Examiner* — Kinam Park
(74) *Attorney, Agent, or Firm* — Howson & Howson LLP

(57) ABSTRACT

A light absorbing layer which is bonded to a laser medium to configure a bonded body, wherein the light absorbing layer is formed from a glass material and, in an oscillation wavelength (wavelength of 650 nm or more and less than 1400 nm) of the laser medium, an absorption coefficient is 0.1 to 10.0 cm$^{-1}$, a difference in refractive index between the light absorbing layer and the laser medium is within ±0.1, and a difference in linear thermal expansion coefficient between the light absorbing layer and the laser medium is within ±1 ppm/K. The present invention relates to a light absorbing layer for preventing parasitic oscillation, and aims to provide a material capable of suppressing the manufac-
(Continued)

turing cost and which can be easily processed for preparing a bonded body.

3 Claims, 1 Drawing Sheet

(51) Int. Cl.
*C03C 4/08* (2006.01)
*H01S 3/16* (2006.01)
*H01S 3/17* (2006.01)

(52) U.S. Cl.
CPC .................. *C03C 4/08* (2013.01); *H01S 3/16* (2013.01); *H01S 3/1643* (2013.01); *H01S 3/17* (2013.01); *H01S 2301/02* (2013.01)

(56) References Cited

U.S. PATENT DOCUMENTS

| | | | | |
|---|---|---|---|---|
| 4,849,036 | A * | 7/1989 | Powell | C03C 4/0071 156/99 |
| 5,084,889 | A * | 1/1992 | Tajima | H01S 3/0604 372/71 |
| 5,572,541 | A * | 11/1996 | Suni | H01S 3/0941 372/39 |
| 5,718,979 | A * | 2/1998 | Marker | C03C 13/046 428/428 |
| 10,056,103 | B2 * | 8/2018 | Inoue | G11B 5/851 |
| 2004/0233960 | A1 * | 11/2004 | Vetrovec | H01S 3/0604 372/67 |
| 2005/0254536 | A1 | 11/2005 | Hackel et al. | |
| 2008/0095202 | A1 | 4/2008 | Yanagisawa et al. | |
| 2011/0176566 | A1 * | 7/2011 | Tsunekane | H01S 3/0941 372/75 |
| 2014/0307305 | A1 | 10/2014 | Deri et al. | |
| 2015/0117476 | A1 | 4/2015 | Akino et al. | |
| 2018/0090904 | A1 * | 3/2018 | Carré | H01S 3/162 |
| 2019/0225533 | A1 * | 7/2019 | Bang | C03C 4/0021 |
| 2020/0244030 | A1 * | 7/2020 | Apitz | H01S 3/0604 |

FOREIGN PATENT DOCUMENTS

| | | |
|---|---|---|
| JP | 2009-182053 A | 8/2009 |
| JP | 2011-146556 A | 7/2011 |
| JP | 2012-222072 A | 11/2012 |
| JP | 2015-086078 A | 5/2015 |
| WO | 2018/043803 A1 | 8/2018 |

OTHER PUBLICATIONS

Akio Ikesue et al., "Ceramic Laser Materials", Nature Photonics, vol. 2, pp. 721-727, Dec. 2008.

Robert M. Yamamoto et al., "The Use of Large Transparent Ceramics in a High Powered, Diode Pumped Solid State Laser," Advanced Solid-State Photonics, OSA Technical Digest Series (CD) (Optical Society of America), paper WC5, 2008 (month unknown) (Abstract only).

S. Banerjee et al., "High-efficiency 10 J diode pumped cryogenic gas cooled Yb:YAG multislab amplifier", Optics Letters, vol. 37, Issue 12, pp. 2175-2177, 2012 (month unknown) (Abstract only).

H.E. Meissner et al., "Edge Cladding Glasses for Solid-State Laser Garnet Crystals", Journal of Applied Physics, vol. 62, No. 7, pp. 2646-2650, Oct. 1987.

Partial Supplementary European Search Report dated Mar. 9, 2022 issued by the European Patent Office in connection with corresponding EP Application No. 19908093.8.

* cited by examiner

[Fig. 1]
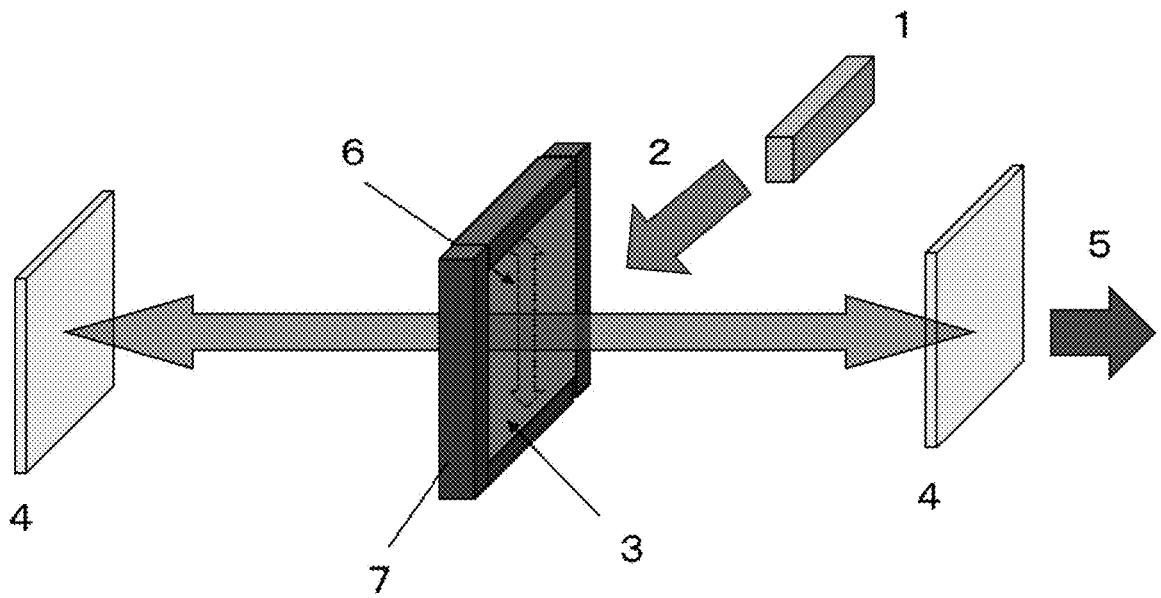
[Fig. 2]
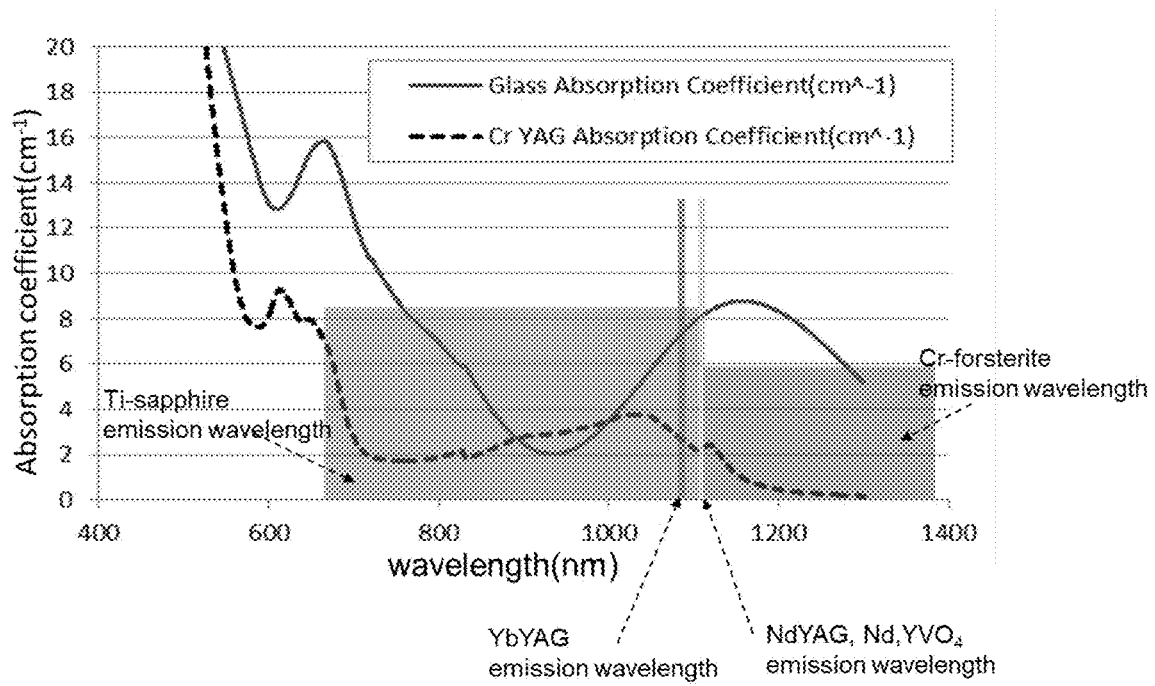

LIGHT ABSORBING LAYER AND BONDED BODY COMPRISING LIGHT ABSORBING LAYER

BACKGROUND

The present invention relates to a light absorbing layer which is bonded to a laser medium to configure a bonded body, and a bonded body comprising the light absorbing layer, and in particular relates to a light absorbing layer suitable for preventing parasitic oscillation of a laser oscillator/amplifier, and a bonded body comprising the light absorbing layer.

A standard laser is an application to excite a laser medium, which is a phosphor, and amplify light in a resonator sandwiched with optically opposed high reflectance mirrors. Furthermore, other than cases where the laser medium itself is used as the oscillation source, there is also an application as an amplifier which amplifies the laser beam output generated from a different medium.

Meanwhile, it is necessary to pay attention to parasitic oscillation when designing a laser application. Parasitic oscillation is where the end face of the laser medium becomes a reflecting surface, and laser oscillation occurs in an orientation that differs from the surface formed with the opposed mirrors, and the problem of this parasitic oscillation becomes notable particularly when the excitation power increases.

When parasitic oscillation occurs, the output will decrease in comparison to the laser beam expected from the resonator configured from the opposed mirrors. Accordingly, in order to prevent this kind of parasitic oscillation, a light absorbing layer having a refractive index comparable to the laser medium (hereinafter sometimes referred to as the "core") is formed around the core to prevent parasitic oscillation.

As a representative example of a high power laser phosphor (laser medium), there is a YAG material. As a high power laser (amplifier), the development of Sm-doped light absorbing layer YAG polycrystals around a Nd:YAG polycrystalline material has been reported (Non-Patent Documents 1 and 2). Furthermore, high power operation by bonding a Cr-doped YAG polycrystalline substance to a Yb:YAG laser polycrystalline substance, which exhibits superior energy storage, has also been confirmed (Non-Patent Document 3).

CITATION LIST

Non-Patent Documents

Non-Patent Document 1: A. Ikesue, Y. L. Aung, Nature Photonics 22, 721-727 (2008)
Non-Patent Document 2: Yamamoto, R. M. et al., Roc, Adv. Solid State Photon, Nara, Japan WC5 (2008)
Non-Patent Document 3: S. Banerjee, et al., Opt. Lett. 37, 2175-2177 (2012)

SUMMARY

Nevertheless, transition metal-doped YAG monocrystals have a high melting point of 1970° C., and the manufacturing cost will be high for crystal growth from a liquid phase. Furthermore, since YAG has high hardness (Knoop hardness: approximately 1500 kgf/mm$^2$), much energy needs to be applied to the abrasive machining process. In addition, since YAG needs to be heated to a high temperature also during thermal bonding, there is a disadvantage when preparing a bonded body of a laser medium (core) and a light absorbing layer.

Moreover, in recent years, the development of laser host materials other than YAG that can also be applied to high power usage has also been reported, and, while a light absorbing layer for preventing parasitic oscillation is also required for these materials, since these materials also have a high melting point and high hardness, similar to a YAG material, it is anticipated that there will be problems in terms of manufacturing cost and processing.

The present invention was devised in view of the foregoing circumstances, and an object of this invention is to provide a light absorbing layer and a bonded body for preventing parasitic oscillation, and in particular to provide a material capable of suppressing the manufacturing cost and which can be easily processed for preparing a bonded body.

In an embodiment of the present invention capable of achieving the foregoing object, provided is a light absorbing layer which is bonded to a laser medium to configure a bonded body, wherein the light absorbing layer is formed from a glass material and, in an oscillation wavelength (wavelength of 650 nm or more and less than 1400 nm) of the laser medium, an absorption coefficient is 0.1 to 10.0 cm$^{-1}$, a difference in refractive index between the light absorbing layer and the laser medium is within ±0.1, and a difference in linear thermal expansion coefficient between the light absorbing layer and the laser medium is within ±1 ppm/K.

The present invention is able to exhibit a superior effect of being able to provide a light absorbing layer for preventing parasitic oscillation and which is capable of suppressing the manufacturing cost and which can be easily processed for preparing a bonded body.

BRIEF DESCRIPTION OF DRAWINGS

FIG. 1 is a schematic diagram of a standard laser application.

FIG. 2 is a diagram showing the absorption spectrum of the light absorbing layer according to an embodiment of the present invention.

DETAILED DESCRIPTION

A schematic diagram of a standard laser application is shown in FIG. 1. Excitation light 2 of a laser diode 1 is used to excite a laser medium 3, which is a phosphor, and light is amplified in a resonator sandwiched by opposed high-reflection mirrors 4, 4', and thereafter emitted as a laser 5. Here, parasitic oscillation 6 in which an end face of the laser medium 3 becomes a reflecting surface, and which oscillates the laser in an orientation that differs from the surface formed with the opposed mirrors 4, 4', occurs. When this parasitic oscillation 6 occurs, since the output will decrease in comparison to the laser beam expected from the resonator configured from the opposed mirrors 4, 4', it is necessary to prevent such parasitic oscillation 6.

In order to prevent this parasitic oscillation 6, a light absorbing layer 7 which has a refractive index comparable to the laser medium (core), and which absorbs light in the oscillation wavelength band of the laser medium, is formed around the core. As the light absorbing layer 7, known is the type of bonding Cr:YAG, Sm:YAG or the like to the laser medium 3 and preventing the parasitic oscillation 6. Nevertheless, YAG monocrystals doped with these transition metals have a high melting point of 1970° C., and the manufacturing cost will be high for crystal growth from a liquid phase. Furthermore, YAG polycrystals have a lower synthesis temperature in comparison to monocrystals and, while they are able to prevent the inclusion of impurities, there are problems in terms of production since a special device is required for its production.

Since YAG crystals have high hardness, much energy needs to be applied to the abrasive machining process, and since YAG needs to be heated to a high temperature also during thermal bonding, there is also difficulty in producing a bonded body of a laser medium and a light absorbing layer. Moreover, in recent years, the development of laser mediums other than YAG that can also be applied to high power usage has also been reported. However, since these materials also have a high melting point and high hardness, similar to a YAG material, it is anticipated that there will be problems in terms of manufacturing cost and processing. In light of the foregoing circumstances, the present inventors considered a substitute material that can be produced easily and processed easily for preparing a bonded body as an absorption layer material of parasitic oscillation.

As a result of intense study regarding a substitute material, the present inventors obtained the following discovery. Since glass has an additive property relative to the physical property of the constituent raw material, the present inventors discovered that a glass material is effective as a light absorbing material for preventing parasitic oscillation since the refractive index and coefficient of thermal expansion can be continuously adjusted according to the raw material ratio, the optical absorption spectrum can be finely adjusted according to the glass system since the optical absorption spectrum of the metal ions in the glass changes primarily according to the coordination state of the surrounding anions, glass can be easily processed into an arbitrary shape since it has high formativeness, and it can be easily bonded to a laser light-emitting device (laser medium).

In light of the foregoing discovery, in an embodiment of the present invention, provided is a light absorbing layer which is bonded to a laser medium to configure a bonded body, wherein the light absorbing layer is formed from a glass material and, in an oscillation wavelength (wavelength of 650 nm or more and less than 1400 nm) of the laser medium, an absorption coefficient is 0.1 to 10.0 $cm^{-1}$, a difference in refractive index between the light absorbing layer and the laser medium is within ±0.1, and a difference in linear thermal expansion coefficient between the light absorbing layer and the laser medium is within ±1 ppm/K. Note that, in the following explanation, the laser medium is sometimes referred to as a core, and the light absorbing layer is sometimes referred to as a clad.

The foregoing glass material is a transparent material having silicate as its main component, and considered may be an alkali silicate-based glass material, an alumino silicate-based glass, a boro silicate-based glass, a germano silicate-based glass, and the like. By adding (doping) transition metal elements to these glass materials, light absorption can be exhibited in an arbitrary range from visible light to an infrared light band. In other words, the absorption spectrum can be tuned according to the oscillation wavelength of the laser. Furthermore, the doping of these absorption elements will hardly change the physical property, such as the refractive index or the coefficient of thermal expansion, to the glass material, which is a parent substance, and light absorption can also be exhibited in a laser oscillation wavelength.

The light absorbing layer according to an embodiment of the present invention has an absorption coefficient of 0.1 to 10.0 $cm^{-1}$ in a laser oscillation wavelength of 650 nm or more and less than 1400 nm. The absorption coefficient of Cr:YAG as a conventional light absorbing layer is 2.0 to 4.0 $cm^{-1}$ (typical value) in a laser oscillation wavelength (wavelength: 1030 nm), and it can be used as a light absorbing layer for preventing parasitic oscillation so as long as the absorption coefficient is 0.1 $cm^{-1}$ or more. This is preferably 2.0 $cm^{-1}$ or more, more preferably 3.0 $cm^{-1}$ or more, and further more preferably 4.0 $cm^{-1}$ or more. FIG. 2 shows the absorption spectrum of the light absorbing layer according to an embodiment of the present invention, and the absorption spectrum of Cr:YAG as a conventional light absorbing layer. As shown in FIG. 2, the light absorbing layer of the present invention exhibits an absorption coefficient that is higher than conventional Cr:YAG in an emission wavelength of Nd:YAG, Yb:YAG, Nd, $YVO^4$, which are laser mediums. Furthermore, it is evident that the light absorbing layer of the present invention exhibits a high absorption coefficient even in laser crystals (Ti-sapphire, Cr-forsterite) other than YAG.

Furthermore, with the light absorbing layer according to an embodiment of the present invention, a difference in refractive index between the light absorbing layer and the laser medium is within ±0.1, and a difference in linear thermal expansion coefficient between the light absorbing layer and the laser medium is within ±1 ppm/K in a laser oscillation wavelength of 650 nm or more and less than 1400 nm. For example, when Nd:YAG is used as the core, since Nd:YAG has a refractive index of 1.82 (wavelength: 1064 nm) and a linear thermal expansion coefficient of 8 ppm/K, the light absorbing layer according to an embodiment of the present invention will have a refractive index in a range of 1.72 to 1.92, and a thermal expansion coefficient in a range of 7 to 9 ppm/K. When the refractive index and the thermal expansion coefficient are within the foregoing ranges, parasitic oscillation can be efficiently prevented without hardly any change to the physical property of the parent material.

As the metal elements to be added to the glass material, one or more elements selected from Ti, V, Cr, Mn, Fe, Co, Ni, Cu, Zr, Nb, Mo, Ru, Rh, Pd, Ag, Sb, Te, La, Sm, Gd, Dy, Tb, Lu, and Bi are preferably used. However, it is not as though the foregoing optical properties can be automatically achieved simply by adding these elements, and the type of metal element(s) to be added and the additive amount thereof need to be adjusted as needed in consideration of the type of glass material as the parent material and the intended absorption coefficient.

Moreover, in a preferred embodiment of the present invention, it is preferable to use a glass material having a melting point of 1500° C. or less. A YAG material as a conventional light absorbing layer has a high melting point of 1970° C. or higher, and the manufacturing cost will be high for crystal growth from a liquid phase. Meanwhile, a glass material can be synthesized in a short period (short time) by using melt extraction or the like and, therefore, the production burden can be reduced and the manufacturing cost can also be reduced.

Furthermore, while YAG has a Knoop hardness of approximately 1500 $kgf/mm^2$, a glass material has a Knoop hardness of approximately 500 to 700 $kgf/mm^2$, and the processing burden can also be reduced.

Furthermore, in a preferred embodiment of the present invention, a part of the glass material can be crystallized to form a glass-crystal complex. It is thereby possible to add the property of the thermal conductivity of crystals to the basic property of glass. Moreover, a glass material is advantageous in that the solid solution amount of the dopant is greater than the monocrystals or polycrystals of YAG, and the additive amount can be adjusted easily. In addition, a glass material (clad) can be bonded irrespective of whether the core material is formed from monocrystals or polycrystals.

An example of the production method of the light absorbing layer (clad) according to an embodiment of the present invention is now explained. As a raw material of the glass material, the raw materials of titanium oxide, silicon oxide, sodium carbonate and the metal elements to be added are weighed and mixed. Mixing may be performed using standard mixing methods and, for example, the raw materials may be mixed with a mortar or the like for about 15 minutes. Next, the mixed powder is placed in a crucible, decarboxylation treatment is performed at a temperature of 100° C. or less with an electric furnace or the like, and then melting is subsequently performed. The melting temperature and the melting time are desirably adjusted in view of the viscosity of the melt. For example, melting may be performed in a temperature range of 1200 to 1500° C. for 1 to 3 hours. Moreover, as the crucible, a platinum crucible or an alumina crucible may be used. The melt is thereafter removed from the furnace and rapidly cooled. After being rapidly cooled, the resulting product is desirably annealed at the glass transition point to remove any strain. A clad to become the light absorbing layer can thereby be produced.

Furthermore, as the method of bonding the glass material (clad) to the laser medium (core), the lateral face part of the core and the bonding face of the clad may be roughened, thereafter heated at a glass transition temperature or higher while applying pressure, and then thermally bonded. Otherwise, after roughening the lateral surface part of the core, this may be introduced into an electric furnace together with a casting mold, and a glass material, which was melted with a different electric furnace, may be poured therein for bonding.

The method of evaluation of various factors may be as follows including the Examples.

Absorption coefficient

The absorption coefficient is evaluated using a two-beam spectrophotometer (UV-3600 Shimadzu Corporation).

Refractive index

The refractive index is derived from the reflectance using a spectroscopic ellipsometer (M-2000 J. A. Woollam).

Thermal expansion coefficient

The thermal expansion coefficient is measured using a Thermomechanical Analyzer (TMA) (TMA8310 Rigaku).

EXAMPLES

The present invention is now explained based on the following Examples. These Examples are illustrative only, and the present invention is not limited in any way based on the Examples. In other words, the present invention is limited only by the scope of its claims, and covers the various modifications other than the Examples included in the present invention.

The properties of conventional Cr:YAG (clad) are shown below by way of reference. The melting point of Cr:YAG is 1970° C., the absorption coefficient is 3.5 cm$^{-1}$ (wavelength: 650 to 1400 nm), the refractive index is 1.82, and the coefficient of thermal expansion is 7.8 ppm/K. Furthermore, when Nd:YAG is used as the laser medium (refractive index: 1.82; coefficient of thermal expansion: 8 ppm/K), the refractive index difference is less than 0.01, and the difference in coefficient of thermal expansion is substantially zero.

Example

As a raw material of a glass material, titanium oxide, silicon oxide, sodium carbonate and nickel oxide were weighed and mixed. Next, this mixed powder was subject to decarboxylation treatment at 800° C., thereafter melted at 1300° C. for 1 hour, and then removed from the furnace and rapidly cooled. After being rapidly cooled, the resulting product was annealed at 600° C. to remove the strain, and a Ni-doped titanosilicate glass (melting point: 1300° C.) was prepared. As a result of evaluating the properties of the obtained glass (clad), the absorption coefficient was 5.0 cm$^{-1}$ (wavelength: 650 to 1400 nm), the refractive index was 1.83 (wavelength: 1064 nm), and the thermal expansion coefficient was 7 ppm/K. Furthermore, when Nd: YAG was used as the laser medium (refractive index: 1.82; coefficient of thermal expansion: 8 ppm/K), the refractive index difference was 0.01, and the difference in coefficient of thermal expansion was 1, and it was possible to obtain a result that was equal to or better than conventional results. In addition, the processing for preparing a bonded body was easier in comparison to Cr: YAG (clad).

INDUSTRIAL APPLICABILITY

The present invention is able to exhibit a superior effect of being able to provide a light absorbing layer for preventing parasitic oscillation of a laser oscillator/amplifier and which is capable of suppressing the manufacturing cost and which can be easily processed for preparing a bonded body by being bonded to a laser medium. The light absorbing layer and the bonded body of the present invention are useful in a laser application such as a high power laser (amplifier).

Description of Reference Numerals

1 laser diode
2 excitation light
3 laser medium (core)
4 mirror
5 laser
6 parasitic oscillation
7 light absorbing layer (clad)

The invention claimed is:

1. A light absorbing layer which is bonded to a laser medium to configure a bonded body, wherein the light absorbing layer is formed from a glass material and, in an oscillation wavelength of wavelength of 650 nm or more and less than 1400 nm of the laser medium, an absorption coefficient is 0.1 to 10.0 cm$^{-1}$, a difference in refractive index between the light absorbing layer and the laser medium is within ±0.1, a difference in linear thermal expansion coefficient between the light absorbing layer and the laser medium is within ±1 ppm/K, the laser medium is one type among Nd: YAG, Yb: YAG, Nd: YVO$_4$, and Cr-forsterite, the light absorbing layer has a melting point of less than 1500° C., the glass material is an alkali silicate-based glass material, an aluminosilicate-based glass material, or a germanosilicate-based glass material, and the glass material is a glass-crystal complex having a portion that is crystallized.

2. The light absorbing layer according to claim 1, wherein the light absorbing layer contains one or more elements selected from Ti, V, Cr, Mn, Fe, Co, Ni, Cu, Zr, Nb, Mo, Tc, Ru, Rh, Pd, Ag, Sb, Te, La, Sm, Gd, Dy, Tb, Lu, and Bi.

3. A bonded body comprising a light absorbing layer bonded to and integrated with a laser medium, wherein the light absorbing layer is formed from a glass material and, in an oscillation wavelength of wavelength of 650 nm or more and less than 1400 nm of the laser medium, an absorption coefficient is 0.1 to 10.0 $cm^{-1}$, a difference in refractive index between the light absorbing layer and the laser medium is within ±0.1, and a difference in linear thermal expansion coefficient between the light absorbing layer and the laser medium is within ±1 ppm/K, wherein the laser medium is Nd: YAG, Yb: YAG, Nd: $YVO_4$, or Cr-forsterite, the light absorbing layer has a melting point of less than 1500° C., the glass material is an alkali silicate-based glass material, an aluminosilicate-based glass material, or a germanosilicate-based glass material, and the glass material is a glass-crystal complex having a portion that is crystallized.

* * * * *